United States Patent [19]
Tate et al.

[11] Patent Number: 5,255,663
[45] Date of Patent: Oct. 26, 1993

[54] STOVE HEAT TRANSFER UNIT WITH IMPROVED ATTACHING MECHANISM

[76] Inventors: Larry M. Tate, 6017 Wessesley Way, Brentwood, Tenn. 37027; James M. Smith, 1256 Meadow Rd., Cookeville, Tenn. 38501

[21] Appl. No.: 929,710

[22] Filed: Aug. 12, 1992

[51] Int. Cl.$^5$ ............................................. F24C 3/00
[52] U.S. Cl. ..................................... 126/41 R; 99/349
[58] Field of Search ............. 99/349; 126/25 R, 41 R; 403/348; 219/243

[56] References Cited

U.S. PATENT DOCUMENTS

| | | | |
|---|---|---|---|
| 2,471,388 | 2/1946 | Farr | 403/405 |
| 2,588,609 | 3/1952 | Blackhall | 403/348 |
| 2,859,057 | 11/1958 | Elsner | 411/85 |
| 2,928,512 | 3/1960 | Slater et al. | 403/22 |
| 4,763,571 | 8/1988 | Bergling et al. | 99/349 |
| 5,070,775 | 12/1991 | Blake | 99/349 |

*Primary Examiner*—Carroll B. Dority
*Attorney, Agent, or Firm*—I. C. Waddey, Jr.

[57] ABSTRACT

The invention is for a stove with a heat transferred unit having an improved attaching mechanism to connect the platen shoe to the heating element of the stove. The stove includes a lower heating element and a top heating unit. The top heating unit has a platen shoe attached to the face thereof. The platen shoe has a non-stick surface on its cooking face and is a continuous flat surface. The back side of the platen shoe contains several slotted openings to receive the head of a stud. The slotted openings have an undercut portion that is pie-shaped and creates a shoulder against which the head of the stud will abut once the stud is inserted into the slotted opening and rotated about its axis. The under cut forms a cavity in the back side of the platen shoe which captures the head of the stud and holds it firmly in place so that the stud may then be passed through holes in the top heating unit of the stove. The platen shoe is then drawn tightly against the top heating unit by tightening nuts onto the ends of the studs passing through the top heating unit.

17 Claims, 2 Drawing Sheets

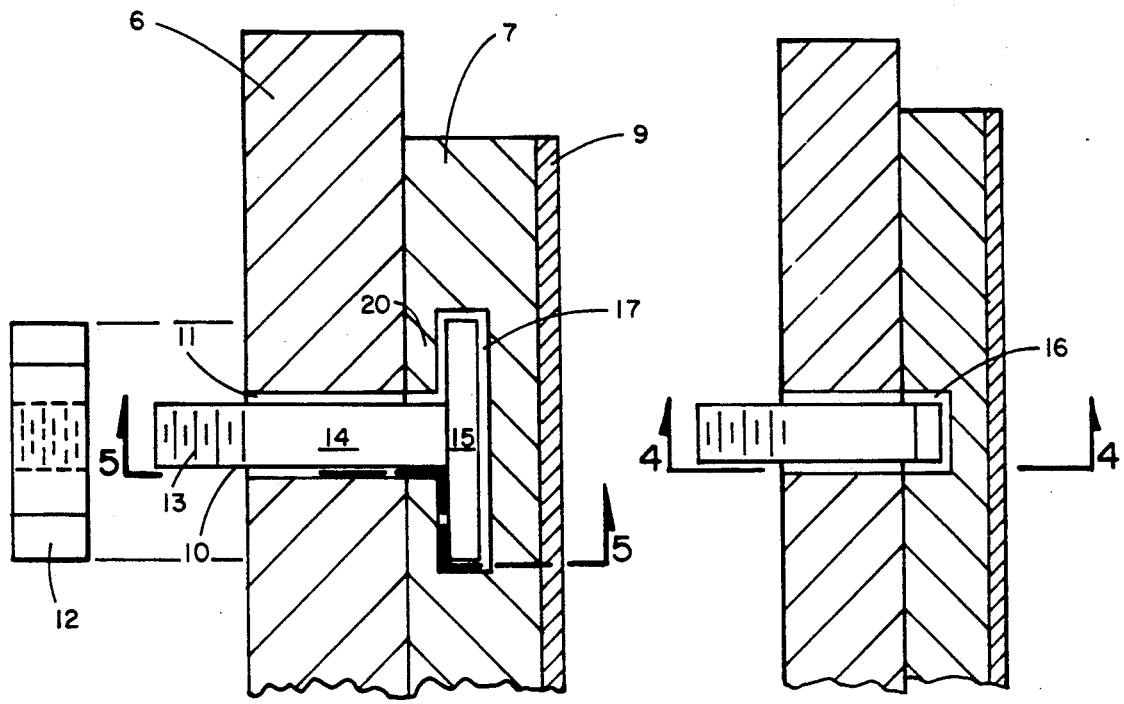
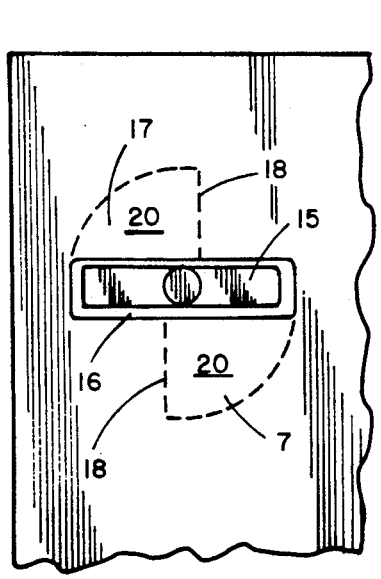
FIG. 6
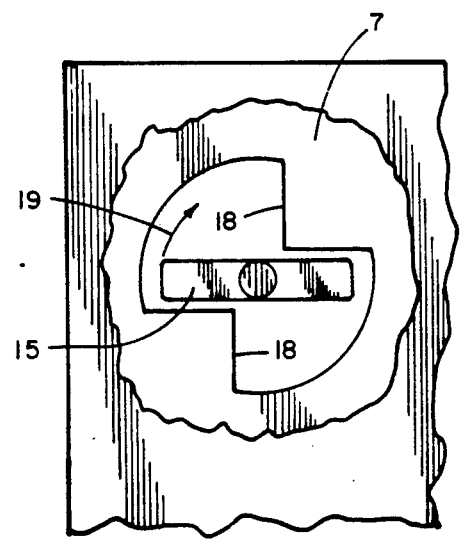
FIG. 7

STOVE HEAT TRANSFER UNIT WITH IMPROVED ATTACHING MECHANISM

BACKGROUND OF THE INVENTION

The present invention relates generally to an improvement for stoves, and more particularly for commercial topside cookers.

Many fast food operations, and particularly restaurants whose primary menu items are hamburgers and the like, use stoves (sometimes referred to as cookers) that cook from both the top side as well as the bottom side of the food item. In these applications, a stove will have a bottom side cooking element which may be a grill covering charcoal or other heat dispersing material. If Charcoal is used as the heat disbursing material, it also serves to catch drippings and create a smoked flavor in the food item. This bottom side cooking element can have its heat generated either from gas or electrical units beneath the grill.

The top side heating element is generally an Aluminum casting or other similar structure carrying one or more heating elements for generating heat therein. To transfer the heat evenly over the grill surface, a heat transfer unit is attached to the top side heating element. The heat transfer unit, commonly referred to as a platen shoe, is made of a material with high conductivity. Generally, the platen shoe in these type applications is made of aluminum which, while having a desirable property of being a highly conductive material, and therefore transmitting the heat evenly over the grill surface on the top of the food item, unfortunately has the undesirable characteristic of being somewhat malleable and therefore can tend to deform in response to both pressure and heat.

In order to get the best possible cooking results from the top side heating element of stoves of this type, it is important that the platen shoe remain absolutely flat. In the past, in order to draw the platen shoe to the top side heating element, counterbored screw holes have been cut through the platen shoe and through the top side heating element and bolts were passed through both of those units with a nut on the end of the bolt securely affixing the platen shoe to the top side heating element. This construction did serve to keep the platen shoe firmly connected to the top side heating element.

Unfortunately this prior arrangements had several drawbacks. Specifically, in cleaning the top side heating element, it was necessary to disassemble the unit in order to get the grease and other accumulated materials from the cooking activities cleaned from the unit. In addition, improvements were made in the platen shoe by coating the cooking surface of the platen shoe with a non-stick material such as the trademark material produced by DuPont De Nemours & Co. under the trademark TEFLON®. This TEFLON® coating on the surface of the platen shoe prevented the food item from sticking to the platen shoe and therefore permitted the cooking process to run more smoothly. While the TEFLON® coating to the cooking surface of the platen shoe improved the cooking process, it created further problems during the cleaning process. When the platen shoe was cleaned, particularly when a spatula or other scrubbing device was used to clean its cooking surface, there was a tendency to chip away the TEFLON® coating around the opening where the bolts passed through the platen shoe.

Those skilled in the art will appreciate that the platen shoe is too thin to use a conventional threaded fastener system with a blind threaded hole in the back of the platen shoe and still meet strength requirements.

In order to solve the problem of the TEFLON® on the platen shoe being scraped from the cooking surface during the cleaning process, some manufacturers of these products have resorted to welding the bolts that pass through the top side heating element to the back side of the platen shoe. This construction allowed a smooth coating of TEFLON® to be placed over the entire cooking surface of the platen shoe. This improvement solved the problem of scraping the TEFLON® from the cooking surface of the platen shoe caused by the discontinuous nature of the coating around the bolt holes passing through the platen shoe.

While the construction of the platen shoe with threaded studs welded to the back of the unit addressed the problem of bolts passing through the platen shoe and creating a likelihood of marring the TEFLON® surface on the cooking side of the unit, the solution also created further problems. If a nut were torqued too tightly, the welded stud would shear from the back side of the platen shoe or the threads on the end of the stud would strip. When this happened, because all of the bolts designed to attach the platen shoe to the top side heating element must be engaged and pulled down tightly to get adequate heat transfer between the top side heating element and the platen shoe, and to keep the surface of the platen shoe absolutely flat, a sheered stud would make the platen shoe unusable. In this circumstance, the platen shoe would have to be shipped back to the manufacturer to have the stud rewelded, a costly process which was time consuming and inefficient.

Furthermore, the platen shoes with the threaded studs welded to the back side thereof created a shipping problem because the studs protruded from the back side of the platen shoes and therefore prevented the platen shoes from being stacked in flat mating relationship when multiple units were shipped to the cooker manufacturers or users. Studs would tend to get bent during shipping, and even if they did not suffer any damage during shipping, this construction raised packing material and shipping cost.

In considering the dilemmas of the prior art, we have concluded that what is needed, and is therefore an object of our invention, is a platen shoe, the cooking side of which is absolutely flat and TEFLON® coated, to get the maximum heat transfer and even cooking that is desired as well as to prevent sticking of the food item being cooked on the top side by the platen shoe and which is easily cleanable, even with the use of spatulas, without marring the TEFLON® surface.

What is further needed, and is therefore an object of this invention, is to have such a platen shoe which is connected to the top side heating element by bolts which, if sheared during the tightening process as a result of over-torquing, can be easily and readily replaced without having to be shipped to the factory.

It is also an object of our invention to provide a platen shoe made of aluminum which can have steel studs attached to the back side thereof for connecting the platen shoe to the top side heating element. Steel studs are much stronger than aluminum studs which had to be used in the prior art devices in order to weld the studs to the platen shoe.

What is also needed, and is therefore a further object of our invention, is a platen shoe which has a connecting device between the platen shoe and the top side heating element which will allow the platen shoe to be shipped in a flat nesting relationship without the necessity of studs protruding from the back side thereof.

BRIEF DESCRIPTION OF THE DRAWINGS

Having described briefly the background of the invention and its objectives, our invention will be more clearly understood upon a review of the following detailed specification, when taken in conjunction with the drawings in which:

FIG. 4 shows a cross section taken along the line 4—4 of FIG. 5.

FIG. 5 shows a cross section taken along the line 5—5 of FIG. 4.

FIG. 6 shows another view similar to FIG. 3 with the bolt oriented in a different position.

FIG. 7 shows a portion of the platen shoe in cut away.

Referring now to the drawings wherein like reference numerals refer to like parts in different figures of the drawings, FIG. 1 shows a perspective view of a commercial stove of the type to which this invention is applicable. The commercial stove 1 has cook surface 2 consisting of a grill 3, which covers charcoal base 5, which in turn is placed over a gas burner 4. The heat for the stove may be created by a gas burner 4 or by electrical elements. As is known in the art, a stove of this construction is designed to receive food stuff on the grill 3. The food stuff may be any of a variety of items such as hamburger patties, chicken, steak or the like, but for simplicity purposes, in this Application, we will refer to the material being cooked as a hamburger patty. The hamburger patty will rest on the grill 3 and be cooked on its lower side by the heat generated from the burner 4. The charcoal bed 5 serves to disperse the heat in an even pattern. In addition, the grease drippings from the hamburger patty will fall on to the charcoal bed, flame and smoke to add flavor to the hamburger patty.

Figure 1:
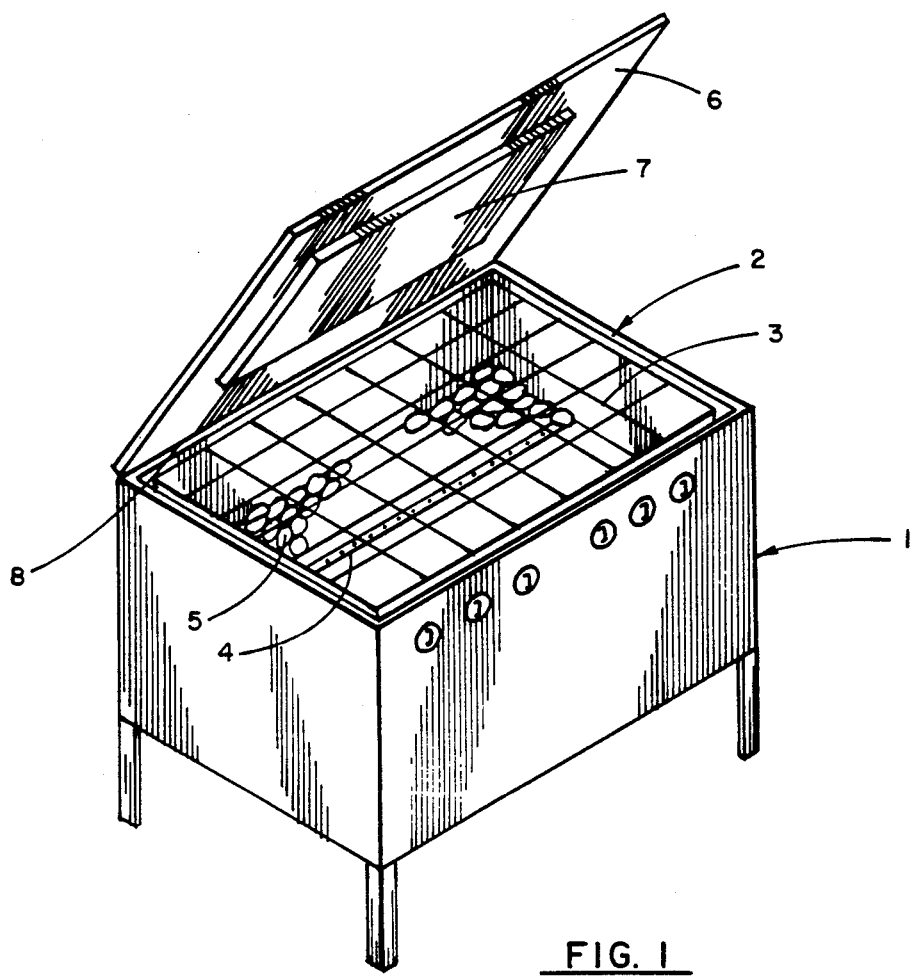
FIG. 1 shows a stove of a type used in conjunction with the present invention.

It has been determined that cooking the hamburger patty from both the bottom side and the top side is beneficial in several respects. First, by cooking the hamburger patty from both sides, the cooking process is faster and more efficient, thus allowing the so-called "fast food franchise" restaurants to serve their customers rapidly and reduce waiting time by their patrons. In addition, by cooking the hamburger patty from both the top and the bottom, there is an evenness of the cooking process and it is not necessary to turn the hamburger patties, thus avoiding the possibility of losing food during that process due to spillage. This cooking process also eliminates the need for additional manpower and avoids the likelihood of having the hamburger patty undercooked on one side and overcooked on another.

Commercial stoves known in the prior art to accommodate the concept of cooking the hamburger patty on both the top and bottom sides have a top heating unit 6 which is hinged at 8 to the base of the stove. The top heating unit 6, being hinged at 8 to the stove 1, pivots about the hinge 8 and is lowered onto the hamburger patty sitting on the grill. The top heating unit 6 generally is made of an aluminum material and includes an integrated heating element, generally an electrical unit which generates heat from the top side of the hamburger patty and creates and even cooking result.

It has been determined that the top of the hamburger patty will cook more evenly and efficiently if a platen shoe 7 is connected to the top heating unit 6 to equally disperse the heat over the entire upper surface of the hamburger patties placed on the grill 3. In the illustration shown in FIG. 1, the platen shoe 7 covers a portion of the underside of the top heating unit; however, the platen shoe could cover the entire underside of the top heating unit 6.

Figure 2:
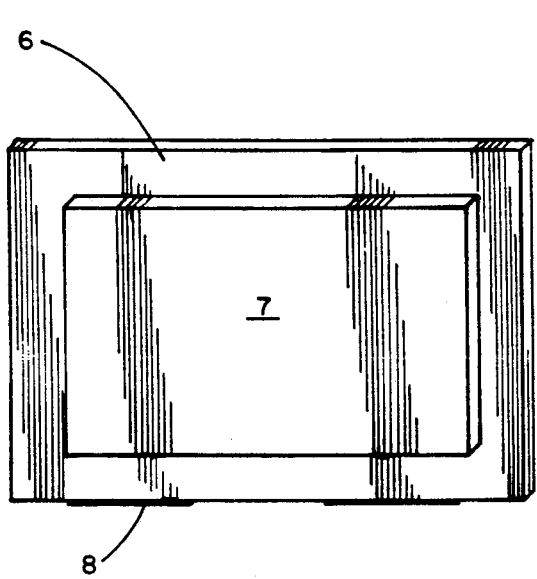
FIG. 2 shows the top cooking element and platen shoe of the stove.

The platen shoe 7 is shown in FIG. 2, in a perspective view, covering a portion of the top heating unit 6. As can be seen in FIGS. 1 and 2, the platen shoe 7 is securely affixed to the top heating unit so as to receive the heat generated by the top heating unit and equally distribute it over the entire cooking surface. The platen shoe 7 is made of a highly conductive material such as aluminum to evenly transmit the heat to the top surface of the hamburger patties that are placed on the grill 3 once the top heating unit is rotated about the hinge connection 8 between the top heating unit 6 and the stove 1.

Referring now to FIGS. 4 and 5, we will describe in more detail the improvement of our invention. FIGS. 4 and 5 show in a substantially magnified view the connecting structure between the platen shoe 7 and the top heating unit 6. FIG. 4 is a cross section taken along any convenient line perpendicular to the plane of the platen shoe 7.

In order to more fully understand the present invention, it will be appreciated by those skilled in the art that it is necessary to have a number of connecting studs connecting the platen shoe 7 to the top heating unit 6. While only one connecting structure is shown, in actual use, there will be several studs connecting the platen shoe to the top heating unit. It is necessary to have several connections in order to hold the platen shoe tightly against the top heating unit to receive the heat generated through the top heating unit and to evenly transmit and disperse that heat over the platen shoe and to provide a cooking service with a constant, uniform heat throughout to be used in cooking the top side of the hamburger patties.

In FIGS. 4 and 5, there is illustrated the top heating unit 6 with a hole 11 form therein. There will be several holes 11 through the top heating unit and the holes will be formed in a pattern which will matched by a pattern of slots 16 contained in one face of the platen shoe. For purpose of convenience, the platen shoe will be referred to as having a front and a back, the front being the surface which is covered by TEFLON ® or other similar material and which constitutes the cooking face of the platen shoe that is placed on the top side of the hamburgers patties on the grill 3. The back of the platen shoe 7 is the portion of the platen shoe that butts against the top heating unit 6 as can be seen in FIGS. 4 and 5.

The back of the platen shoe has a plurality of slotted openings 16 and the pattern of the slotted opening 16, at the midpoint of the slot, mirrors the pattern of the holes 11 contained in the top cooking unit 6. As can be more clearly seen from FIGS. 3, 6 and 7, the slotted opening 16 is designed to receive the head 15 of stud 10. The head 15 of stud 10 is elongated and fits into the slotted opening 16 when the elongated axis of the elongated head 15 is aligned in the same direction as the elongated axis of the slotted opening 16. This arrangement can be best seen from FIG. 6. When the head 15 is passed through the slotted opening 16 and is rotated about its axis, it then fits into a cavity created by the undercut 17. The undercut 17 creates a lip 20 on the back side of the platen shoe 7. The undercut 17 is made with an arcuate portion having a radius approximately equal to ½ the length of the head 15 of stud 10 and terminates at a shoulder 18. There are two undercut portions on the back side of the platen shoe 7. Looking at FIG. 6, in this example of the preferred embodiment, these two undercut portions 17 are in the second and fourth quadrants that are created when imaginary lines are drawn parallel to the elongated axis of the head 15 of stud 10 and a secondary line perpendicular to the first. The undercuts 17 create pie-shaped cavities within the thickness of the platen shoe 7. In another embodiment of the invention, the undercuts 17 are cam shaped, the significance of the shape of the undercuts 17 being that they allow the head 15 of the stud 10 to be captured within the cavity created by the undercuts and to abut against the shoulders created by the undercuts to stop the rotation of the studs 10 when they respond to the action of the nut being tightened onto their threaded ends.

FIG. 7 shows a cut-away of the slotted arrangement shown in FIG. 6. As can be seen in FIG. 7, once the head 15 is passed through the slotted opening 16, the stud 10 can be rotated in the direction of arrow 19 through a 90° arc until the face of the head 15 butts against the shoulder 18 formed in the back side of the platen shoe 7. The elongated portion of the head 15, when the stud 10 is rotated, passes under the lip 20 and into the cavity created by the undercut 17 to securely connect the stud to the platen shoe 7. The shank 14 of the stud 10 then passes through the opening 11 and the entire unit is assembled in a fixed relationship by the nut 12 which is screwed on to the threads 13 on the end of stud 10.

Figure 3:
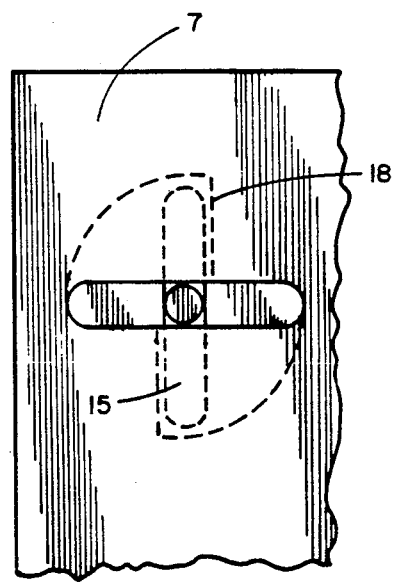
FIG. 3 shows a section of the platen shoe in plain view looking from the back side of the unit.

In operation, as can be seen from FIG. 3, once the head 15 of the stud 10 is rotated clockwise 90°, the head 15 is captured in the cavity created by the undercut 17 to prevent the stud 10 from disconnecting from the platen shoe 7.

The platen shoes 7 can be shipped to the stove manufacturer in a flat stacked relationship and the studs 10 shipped separately. Similarly, if a replacement platen shoe 7 must be shipped to a user, several of the platen shoes 7 can be shipped in one package in a compact and efficient manner.

If, during the course of assembling the platen shoe 7 to the top heating unit 6, the nut 12 is torqued too tightly onto the stud 10, causing the stud 10 to shear, the unit can be repaired by simply removing the platen shoe 7 and replacing the stud 10 with a new undamaged stud of similar construction.

When assembling the platen shoe, the stud 10 is connected to the platen shoe by inserting the elongated head of the stud 15 into the elongated slot 16. This position of the stud head is shown in FIGS. 6 and 7. The stud 10 is then rotated 90° clockwise to the position shown in FIG. 3 and the head 15 is caught beneath the lip 20 in the cavity formed by the undercut 17. The head 15 stops when it butts against shoulder 18. In this position, the plate shoe is placed flush against the top heating unit 6 as shown in FIGS. 4 and 5 with the studs 10 passing through the holes 11 in the top heating unit 6.

Thereafter, the nut 12 is threaded onto the threads 13 on stud 10 and tightened down against the back side of the top heating unit 6. There are sufficient number of studs 10 and slots 16 with mirrored opening holes 11 in a single unit to provide a secure, flat connection between the two parts. This readily allows the maximum efficiency in heat transfer between the top heating unit 6 and the platen shoe 7. This construction also allow the platen shoe to remain perfectly flat against the top heating unit 6 so that the front TEFLON ® coated surface of the platen shoe will evenly distribute the heat over that unit to provide a constant temperature cooking surface for the top of the hamburger patties. In the event that the platen shoe needs to be removed from the top heating unit 6 because of a broken stud 10 or in order to have the unit refurbished, to re-coat the front of the heat dispersing unit 7 with TEFLON ® or for any other reason, it is only necessary to unscrew the nut 12, rotate the stud 10 counter-clockwise until the elongated head 15 is aligned with the slotted opening 16 and remove the stud 10 from the slotted opening 16. The platen shoe 7 may then be packaged for shipment without having studs protruding from the unit and the likelihood of any significant damage to the unit during transportation.

While we have described particular embodiments of the present invention of a new and useful Stove Platen shoe With Improved Attaching Mechanism, it is not intended that such references be construed as limitations upon the scope of this invention except as set forth in the following claims.

What I claim is:

1. A stove comprising a grill, a top heating unit, said top heating unit hingedly connected to said stove at a hinge point so that said top heating unit may be rotated about said hinge point to overlie said grill, a platen shoe having a front side and a back side, said platen shoe connected to said top heating unit at multiple points, and means for connecting said platen shoe to said top heating unit at said multiple points comprising studs having an enlarged head at one end, a shank protruding therefrom and threads on an end of said shank opposite from said head, multiple holes in said upper heating unit, said studs passing through said holes, means for attaching said head of said studs to said platen shoe upon rotation in one direction and for releasing said studs from said platen shoe upon rotation in an opposite direction, said studs protruding from said back side of said platen shoe, and said front side of said platen shoe being a solid, continuous surface without any penetration therein.

2. The device as set forth in claim 1 with said means connecting said studs to said platen shoe upon rotation of said studs about their axes less than 180° in one direction and disconnecting said studs from said platen shoe upon reversing said rotation.

3. The device as set forth in claim 1 wherein said heads of said studs are elongated.

4. The device as set forth in claim 1 wherein said means for attaching said heads of said studs includes elongated slots in said back side of said platen shoe into which the heads of the studs are inserted, said slots being shaped to capture said heads.

5. The device as set forth in claim 4 wherein said slots in said back side of said platen shoe are undercut to create a lip against which said heads of said studs will abut upon rotation of said studs.

6. The device as set forth in claim 5 wherein said undercuts are pie shaped.

7. The device as set forth in claim 6 where, there are two pie shaped under cuts for each slot.

8. The device as set forth in claim 6, where in there are two pie shaped under cuts on opposite sides of said slot.

9. The device as set forth in claim 6 where in there are two pie shaped undercuts in diametrically opposing quadrants of said slot.

10. The device as set forth in claim 1 wherein said top heating unit and said platen shoe are flat, plate-like structures.

11. The device as set forth in claim 1 wherein said face of said platen shoe is coated with a non-stick substance such as TEFLON.

12. The device as set forth in claim 5 wherein said slots create cavities within the thickness of said platen shoe.

13. The device as set forth in claim 1 wherein said platen shoe is made of aluminum.

14. The device as set forth in claim 5 wherein the said undercuts are cam shaped to form a shoulder against which the heads of the studs abut when the studs are inserted into the slots and rotated about their axes.

15. A stove comprising:
 a. a grill;
 b. a top heating unit, said top heating unit hinged to said stove at a hinged section so that said top heating unit may be rotated about said hinged section to overlie said grill;
 c. a platen shoe having a front side and a back side, said platen shoe connected to said top heating unit at multiple points;
 d. means for connecting said platen shoe to said top heating unit at said multiple points; and
 e. said means for connecting said platen shoe to said top heating unit includes slots in said platen shoe which do not penetrate the thickness of said platen shoe and second means which fit within said slots and attach to said platen shoe when rotated in one direction and disconnect from said platen shoe when rotated in another direction.

16. The stove of claim 14 wherein said means for connecting said platen shoe to said top heating unit at said multiple points comprises a studs having a head at one end, a shank protruding from said head, and threads on an end of said shank opposite from said head, multiple holes in said upper heating unit, said studs passing through said holes, said heads of said studs removably connected to said platen shoe, said studs protruding from said back side of said platen shoe, and said front side of said platen shoe being a solid, continuous surface without any penetration therein.

17. The device as set forth in claim 15 wherein said means for connecting said platen shoe to said top heating unit includes studs which are removable connected to slots in said platen shoe upon rotation of said studs about an axis less than 180° in one direction and disconnected from said platen shoe by reversing said rotation.

* * * * *